US006424347B1

(12) United States Patent
Kwon

(10) Patent No.: US 6,424,347 B1
(45) Date of Patent: Jul. 23, 2002

(54) INTERFACE CONTROL APPARATUS FOR FRAME BUFFER

(75) Inventor: Ki-Young Kwon, Seoul (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 0 days.

(21) Appl. No.: 09/290,611

(22) Filed: Apr. 13, 1999

(30) Foreign Application Priority Data

Dec. 15, 1998 (KR) .......................................... 98-55125

(51) Int. Cl.[7] ............................................... G06F 13/14
(52) U.S. Cl. ........................ 345/520; 345/558; 345/538
(58) Field of Search ................................ 345/520, 531, 345/559, 558, 501, 530, 536–538; 710/126–130

(56) References Cited

U.S. PATENT DOCUMENTS

| | | | | |
|---|---|---|---|---|
| 5,640,545 A | | 6/1997 | Baden et al. ............... | 345/564 |
| 5,793,996 A | * | 8/1998 | Childers et al. ........ | 345/520 X |
| 5,828,853 A | * | 10/1998 | Regal ......................... | 710/128 |
| 5,928,349 A | * | 7/1999 | Loen et al. .................... | 712/1 |

* cited by examiner

*Primary Examiner*—Kee M. Tung
(74) *Attorney, Agent, or Firm*—Birch, Stewart, Kolasch & Birch, LLP

(57) ABSTRACT

An interface control apparatus for a frame buffer including a byte swapping/sampling controller connected between the PCI host bus and a FIFO (First In First Out) for performing a data conversion between a big Endian data and a little Endian data or a data conversion between a system data and a user data, a byte conversion/view selection controller connected between the FIFO and the SRAM for converting a pixel data stored in the FIFO from a 8 bit-1 byte data to a 9 bit-1 byte data in accordance with a view selected or converting a pixel data stored in the SRAM from a 9 bit-1 byte data into a 8 bit-1 byte in accordance with a view selected, a RAC for controlling a transmission of a pixel data between the SRAM and the RAM but DRAM, and a display controller for receiving a pixel data outputted from the RAM bus DRAM through the RAC and outputting to the RAM-DAC through the display bus, for thereby concurrently performing a pixel data conversion between a big Endian and a little Endian and a pixel data conversion for a 8 bit-1 byte and 9 bit-1 byte in a 8 bit-1 byte PCI host bus and a 9 bit-1 byte RAM bus DRAM each using a system memory having different byte definition and bus-endian.

30 Claims, 11 Drawing Sheets

FIG.8
| | INPUT BYTE | | | | | | | |
|---|---|---|---|---|---|---|---|---|
| OUTPUT | B7 | B6 | B5 | B4 | B3 | B2 | B1 | B0 |
| R0 | 7 | 6 | 5 | 4 | 3 | 2 | 1 | 0 |
| R1 | 6 | 5 | 4 | 3 | 2 | 1 | 0 | 7 |
| R2 | 5 | 4 | 3 | 2 | 1 | 0 | 7 | 6 |
| R3 | 4 | 3 | 2 | 1 | 0 | 7 | 6 | 5 |
| R4 | 3 | 2 | 1 | 0 | 7 | 6 | 5 | 4 |
| R5 | 2 | 1 | 0 | 7 | 6 | 5 | 4 | 3 |
| R6 | 1 | 0 | 7 | 6 | 5 | 4 | 3 | 2 |
| R7 | 0 | 7 | 6 | 5 | 4 | 3 | 2 | 1 |
FIG.9A
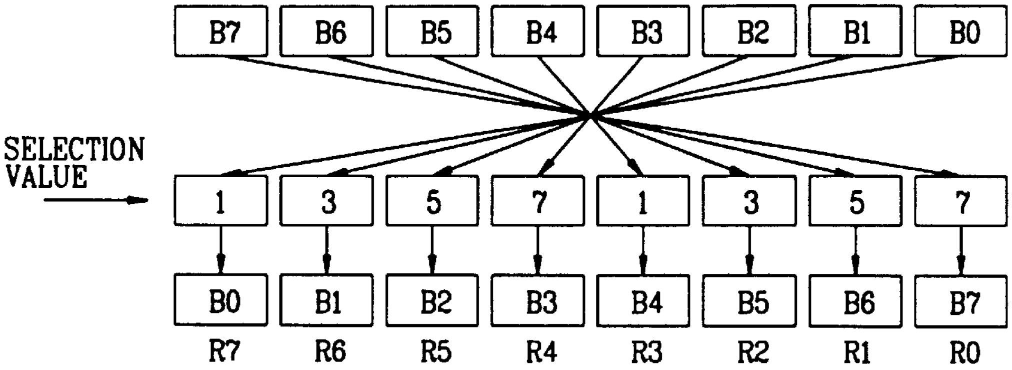
FIG.9B
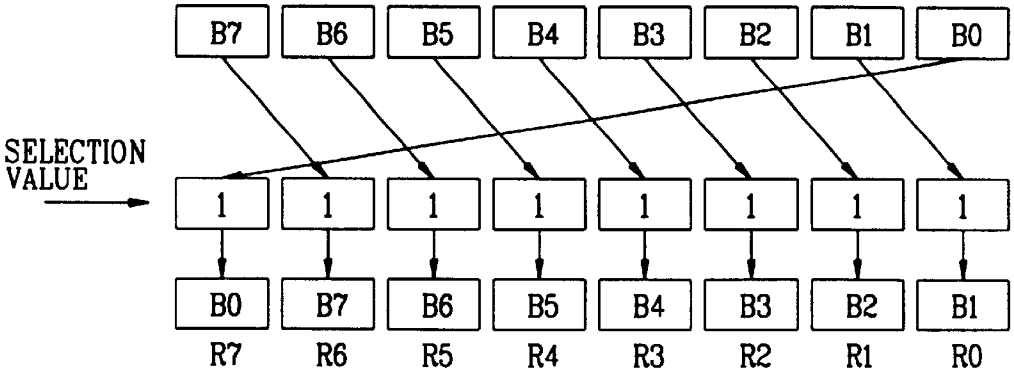

FIG. 10
| VIEW SELECTION VALUE | VIEW | VIEW SELECTION VALUE | VIEW |
|---|---|---|---|
| 0×0 | 8 BIT VIEW | 0×8 | 2 ER VIEW |
| 0×1 | 18 BIT VIEW | 0×9 | 3 ER VIEW |
| 0×2 | 16 BIT VIEW | 0×A | RESERVED |
| 0×3 | 32 BIT VIEW | 0×B | RESERVED |
| 0×4 | 555 RGB BIT VIEW | 0×C | RESERVED |
| 0×5 | 565 RGB VIEW | 0×D | RESERVED |
| 0×6 | 24 BIT VIEW | 0×E | RESERVED |
| 0×7 | 1 ER VIEW | 0×F | RESERVED |
FIG. 11A
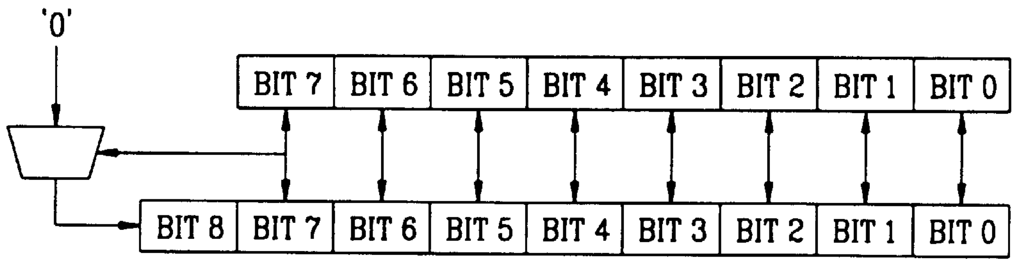
FIG. 11B
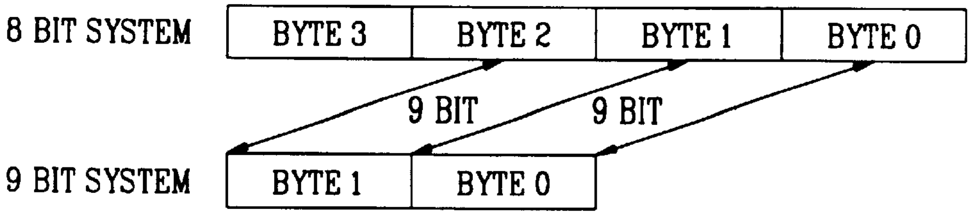

INTERFACE CONTROL APPARATUS FOR FRAME BUFFER

BACKGROUND OF THE INVENTION

1. Field of the Invention

The present invention relates to an interface control apparatus for a frame buffer, and in particular to an improved interface control apparatus for a frame buffer which is capable of effectively performing a pixel data conversion between systems having different byte definitions and Endians.

2. Description of the Background Art

FIG. 1 illustrates an interface control apparatus for a conventional frame buffer which is disclosed in the U.S. Pat. No. 5,640,545.

As shown therein, a system bus 101 is formed of an address bus 103 and a data bus 105. The system bus 101 is a 64-bit bus using a 8-bit as one byte and uses a big Endian data. In addition, the address bus 103 and data bus 105 mux the system bus 101 of 64-bit.

A processor 107 accesses the system bus 101, and a main memory server system 109 controls a SRAM(Static Ramdom Access Memory), a DRAM(Dynamic Random Access Memory), a ROM(Read Only Memory), a cache memory, etc. In addition, an expansion bus 111 is a little bus capable of transmitting 32-bit data in parallel and is connected with a video input apparatus 113.

The bridge/graphic controller 115 is one of the important elements of the conventional art includes a pixel unscramble logic 117 for judging whether or not a pixel data conversion is needed and performing a pixel data conversion and performs a data conversion and data transmission operation between the system bus 101 and the expansion bus 111.

The frame buffer 119 stores a big Endian(BE) type pixel data to be displayed and includes a DRAM port 121 for communicating a pixel data with the bridge/graphic controller 111, and a SAM(Serial Access Mode) port 123 accessing the pixel data stored in the frame buffer 119 and outputting to a RAM D/A converter(hereinafter called RAMDAC) 125.

The RAMDAC(Random Access Memory D/A Converter) 125 is designed to receive a big Endian(BE) data and converts the digital data from the SAM port 123 into an analog data and outputs to a video output apparatus 127.

Figure illustrate the bridge/graphic controller 111.

As shown therein, multiplexers 203, 205, 207, 209, 211, 213, 215, 217, 219 and 221 and flip-flops 223, 225, 227, 229, 231 and 233 perform a switching operation and a buffering operation of each pixel data between the data bus 105, the expansion bus 111, and the frame buffer 119.

The controller 253 generates various control signals for adjusting the operations of all elements in the bridge/graphic controller 115, and the input/output byte swap multiplexers 249 and 251 performs an end-for-end byte swapping operation in accordance with the mode selection signal(BE mode or LE mode). In addition, the input/output byte swap multiplexers 249 and 251 form the constructions of the pixel unscramble logic 117 together with the byte rearranging logic 257.

A FIFO(First-In-First-Out) 235 buffers the 64-bit wide data written from the data bus 105 into the expansion bus 111, a FIFO 237 buffers a 64-bit wide data written from the data bus 105 or the frame buffer 119 into the expansion bus 111.

A FIFO 245 buffers the 64-bit wide data from the data bus 105 into the frame buffer 119, a FIFO 247 buffers the 64-bit wide data written from the expansion bus 111 into the frame buffer 119.

A FIFO 243 buffers the 64-bit wide data read from the 64-bit buffer 119 and transmitted to the data bus 105, and FIFO 239 and 241 buffers the 64-bit wide data transmitted from the expansion bus 111 to the data bus 105.

The operation of the interface control apparatus for the conventional frame buffer will be explained.

The conventional interface control apparatus for the frame buffer is directed to a technique for transferring a frame buffer data between the system bus 101, the expansion bus 111 using the little Endian, and the video output apparatus.

The bridge/graphic controller 115 provides an interface between the system bus 101 and the DRAM port 121 of the frame buffer 119 and receives a frame buffer access request from the system bus 101 and provides to the frame buffer 119. In addition, the bridge/graphic controller 115 provides a path from the expansion bus is 111 to the frame buffer 119 and performs a bridge function for communication between the system bus 101 and the expansion bus 111.

The bridge/graphic controller 115 performs a control operation in accordance with various control signals outputted from the controller 253 as shown in FIG. 2.

Namely, the big Endian data inputted into the data bus 105 are converted into the little Endian data by the input byte swap multiplexer 249 in accordance with the mode selection signal, and the thusly converted little Endian data are stored into the FIFO 235 or the FIFO 237 and are outputted to the expansion bus 111.

In addition, the little Endian data inputted from the expansion bus 111 is stored into the FIFO 239 or the FIFO 641 and is converted into a big Endian data by the output byte swap multiplexer 251 in accordance with the mode selection signal and is outputted to the data bus 105.

At this time, the input byte swap multiplexer 249 as shown in FIG. 3A bypasses the pixel data at the data bus 105 when the mode selection signal is 0, and the pixel data at the data bus 105 is processed based on the end-for-end swapping when the mode selection signal 1. In addition, as shown in FIG. 3B, the output byte exchange multiplexer 251 basically performs the same operation as the input byte exchange multiplex 249.

The pixel unscramble logic 117 formed of the input/output byte swap multiplexers 249 and 251 and the byte rearranging logic 257 is controlled by a mode selection signal and pixel unscramble control signal. The above-described control signals are generated by the controller 253 in accordance with the mode (BE or LE mode) of the processor 107, the pixel depths 32 bpp, 16 bpp, 8 bpp, and the transmitted pixel type.

In the information concerning the pixel type, the pixel data is decoded to a part of the pixel address indicating the position to be stored and searched from the frame buffer 119, and the information with respect to the mode of the processor 107, and the pixel depth is provided from the process 107 to the controller 253 at the initialization stage of the system and is stored into the control register 253*a*.

The bridge/graphic controller 115 converts the big Endian data inputted through the data bus 105 into the little Endian data through the input byte swap multiplexer 249 and stores into the FIFO 245 and unscrambles the pixel data using the byte rearranging logic 257 and then the thusly unscrambled data are outputted to the frame buffer data bus 201 or the data inputted from the expansion bus 111 into the FIFO 247, and the pixel data are unscrambled by the byte rearranging logic 257 and are outputted to the frame buffer data bus 201.

In addition, the bridge/graphic controller 115 unscrambles the data read from the frame buffer 119 through the byte rearranging logic 257 and stores into the FIFO 237 and outputs to the expansion bus 111 or stores into the FIFO 243. The little Endian data are converted into the big Endian data by the output byte swap multiplex 251 and are outputted to the data bus 105.

At this time, as shown in FIG. 4, the byte rearranging logic 657 includes a frame buffer input multiplexer 257*a* rearranging the pixel data written into the frame buffer 119 in accordance with a pixel unscramble control signal outputted from the controller 253, and a frame buffer output multiplexer 257*b* rearranging the pixel data read from the fame buffer 119 in accordance with a pixel unscramble control signal outputted from the controller 253.

The frame buffer input multiplexer 257*a* performs a data conversion during the write operation of the frame buffer 119 in which the frame buffer(FB) read signal is disabled, and the frame buffer output multiplexer 257*b* performs a data conversion during the read operation of the frame buffer 119 in which the FB read signal is enabled.

Namely, the frame buffer input/output multiplexers 257*a* and 257*b* process the data based on the end-for-end byte swap irrespective of the depth of pixel in accordance with the pixel unscramble control signal when the pixel data is a BE type(output of "0") and process the data based on the end-for-end word swap(32-bit)(output of "1") when the pixel data is a LE type and the depth of the pixel is 32 bpp.

In addition, the input/output multiplexers 257*a* and 257*b* process the data based on the end-for-end half-word swap (16-bit) in accordance with the pixel unscramble control signal when the pixel data is the LE type, and the depth of the pixel is 16 bpp(output of "2"), and process the data based on the byte swap(output of "3") when the pixel data is the LE type, and the depth of the pixel is 8 bpp.

Therefore, the pixel data[0:63] which is converted to the big-endian is outputted to the frame buffer 119, and the RAMDAC 125 converts the digital data read through the SAM port 123 into an analog data and outputs to the video output apparatus 127.

However, in the conventional interface apparatus of the frame buffer, the pixel data is easily converted between the systems having different bus Endians. However, in the system having different byte definitions and different bus Endians, the pixel data conversion is not easily implemented.

Namely, in the conventional art, it is possible to implement a pixel data conversion between the big Endian and the little Endian. In the case that the pixel data conversions between the system in which the 8-bit is defined as 1-byte and the system in which the 9-bit is defined as 1-byte are concurrently requested, it is impossible to implement the pixel data conversions concurrently.

SUMMARY OF THE INVENTION

Accordingly, it is an object of the present invention to provide an interface control apparatus for a frame buffer which overcomes the aforementioned problems encountered in the background art.

It is another object of the present invention to provide an interface control apparatus for a frame buffer which is capable of concurrently performing a pixel data conversion between a big Endian and a little Endian and a pixel data conversion for a 8 bit-1 byte and 9 bit-1 byte in a 8 bit-1 byte PCI host bus and a 9 bit-1 byte RAM bus DRAM each using a system memory having different byte definition and bus-endian.

To achieve the above objects, there is provided an interface control apparatus for a frame buffer which includes a byte swapping/sampling controller connected between the PCI host bus and a FIFO(First In First Out) for performing a data conversion between a big Endian data and a little Endian data or a data conversion between a system data and a user data, a byte conversion/view selection controller connected between the FIFO and the SRAM for converting a pixel data stored in the FIFO from a 8 bit-1 byte data to a 9 bit-1 byte data in accordance with a view selected or converting a pixel data stored in the SRAM from a 9 bit-1 byte data into a 8 bit-1 byte in accordance with a view selected, a RAC for controlling a transmission of a pixel data between the SRAM and the RAM bus DRAM, and a display controller for receiving a pixel data outputted from the RAM bus DRAM through the RAC and outputting to the RAMDAC through the display bus.

In the present invention, there is provided a byte swapping/sampling controller which converts a big-endian data into a little-endian data or a little-endian data into a big-endian data, and converts a system data into a user data or a user data into a system data.

In addition, in the present invention, there is provided a byte conversion/view selection controller which converts the pixel data(8 bit-1 byte) stored in the FIFO into the 9 bit-1 byte data in accordance with the selected view using the byte conversion/view selection controller or converts the pixel data(9 bit-1 byte) stored in the SRAM into the 8 bit-1 byte in accordance with the view selected.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a table illustrating a selection value stored in the selection value storing register of FIG. 6;

FIGS. 9A and 9B are views illustrating an embodiment of a byte swapping and byte sampling performed by the data converter of FIG. 6;

FIG. 10 is a table illustrating a view selection value stored in the view selection register of FIG. 7;

FIGS. 11A and 11B are views illustrating an embodiment of a 8-bit view data conversion and 18-bit data conversion performed by the data converter of FIG. 7;

DETAILED DESCRIPTION OF THE PREFERRED EMBODIMENTS

Figure 1:
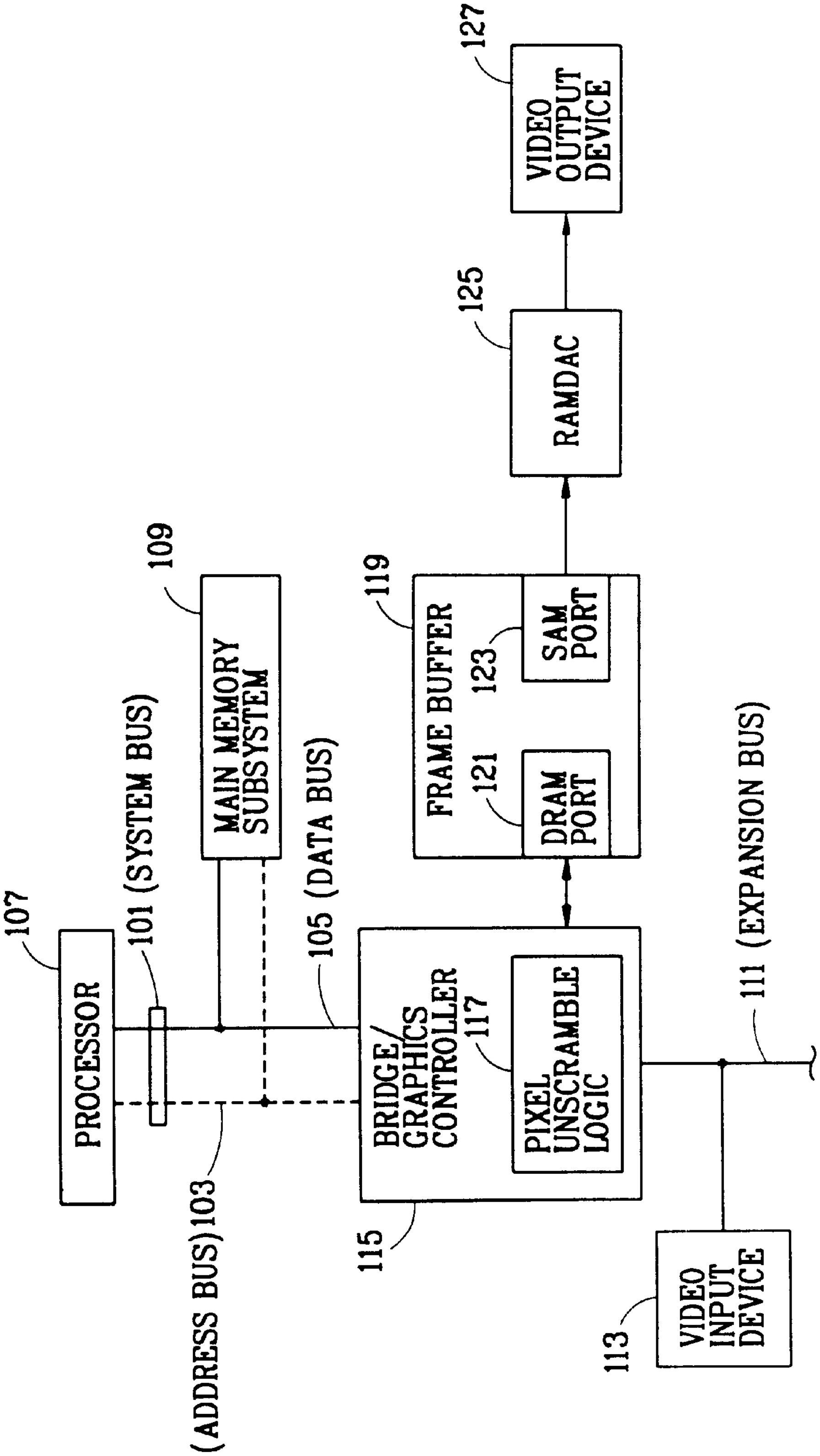
FIG. 1 CONVENTIONAL ART
FIG. 1 is a block diagram illustrating a conventional interface control apparatus for a frame buffer.
Figure 2:
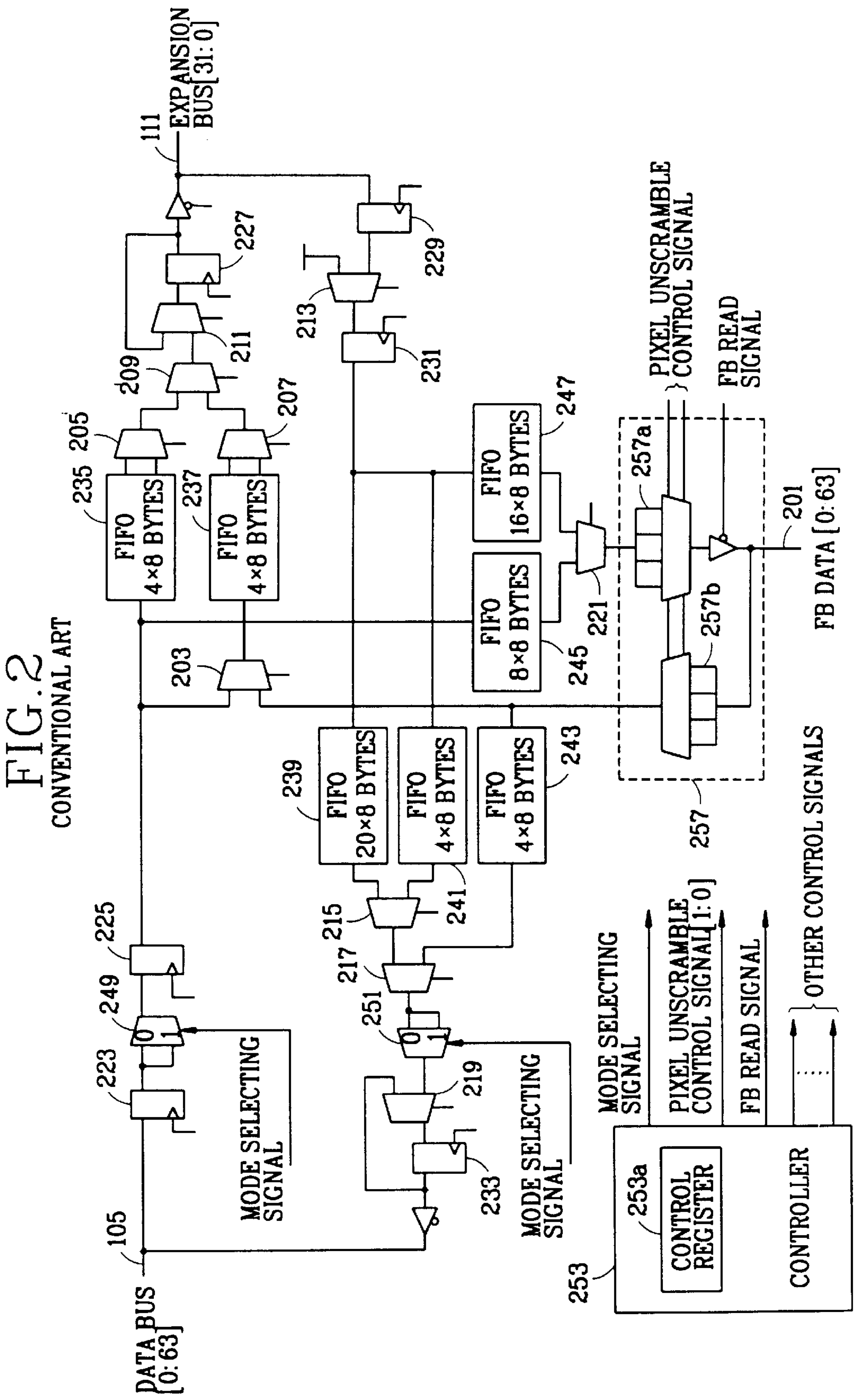
FIG. 2 CONVENTIONAL ART
FIG. 2 is a detailed circuit diagram illustrating the bridge/graphic controller of FIG. 1.
Figure 3A:
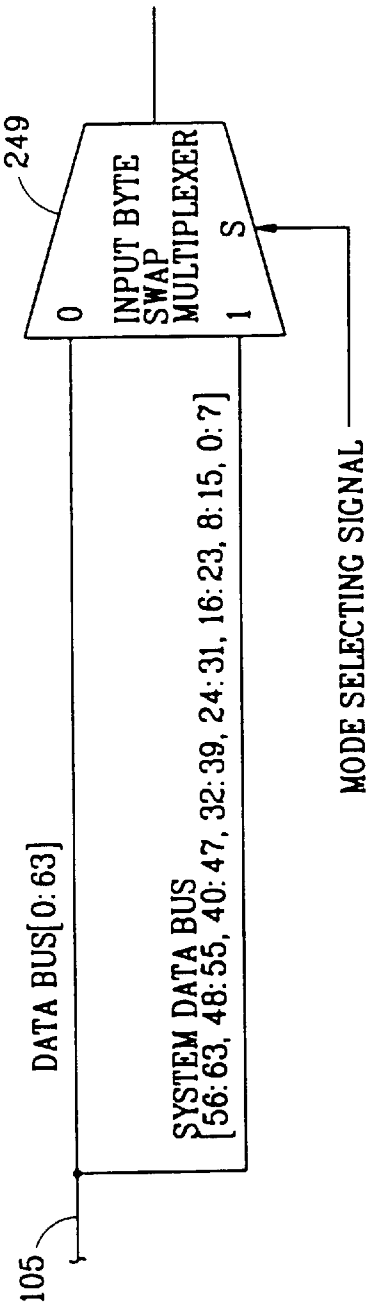
FIG.3A CONVENTIONAL ART
FIGS. 3A and 3B are views illustrating a swapping operation of an input byte/output byte swap multiplexer.
Figure 3B:
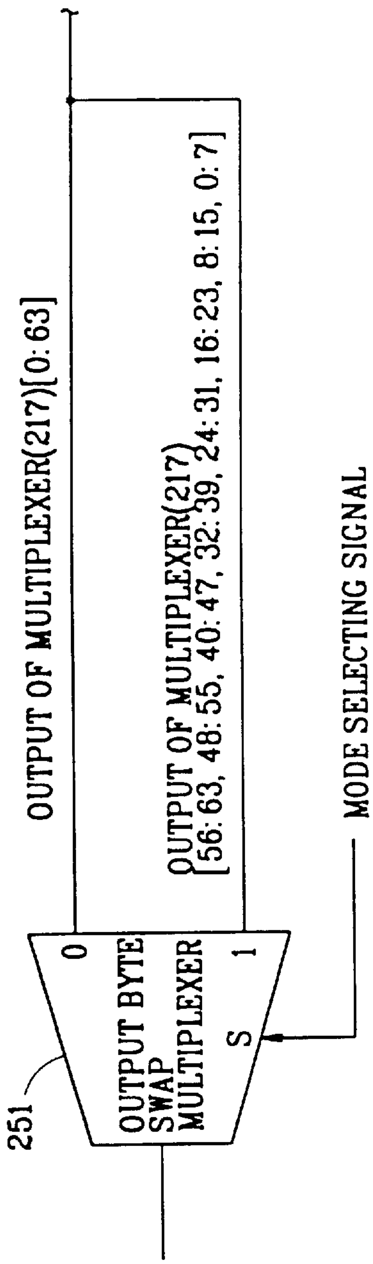
FIG.3B CONVENTIONAL ART
Figure 4:
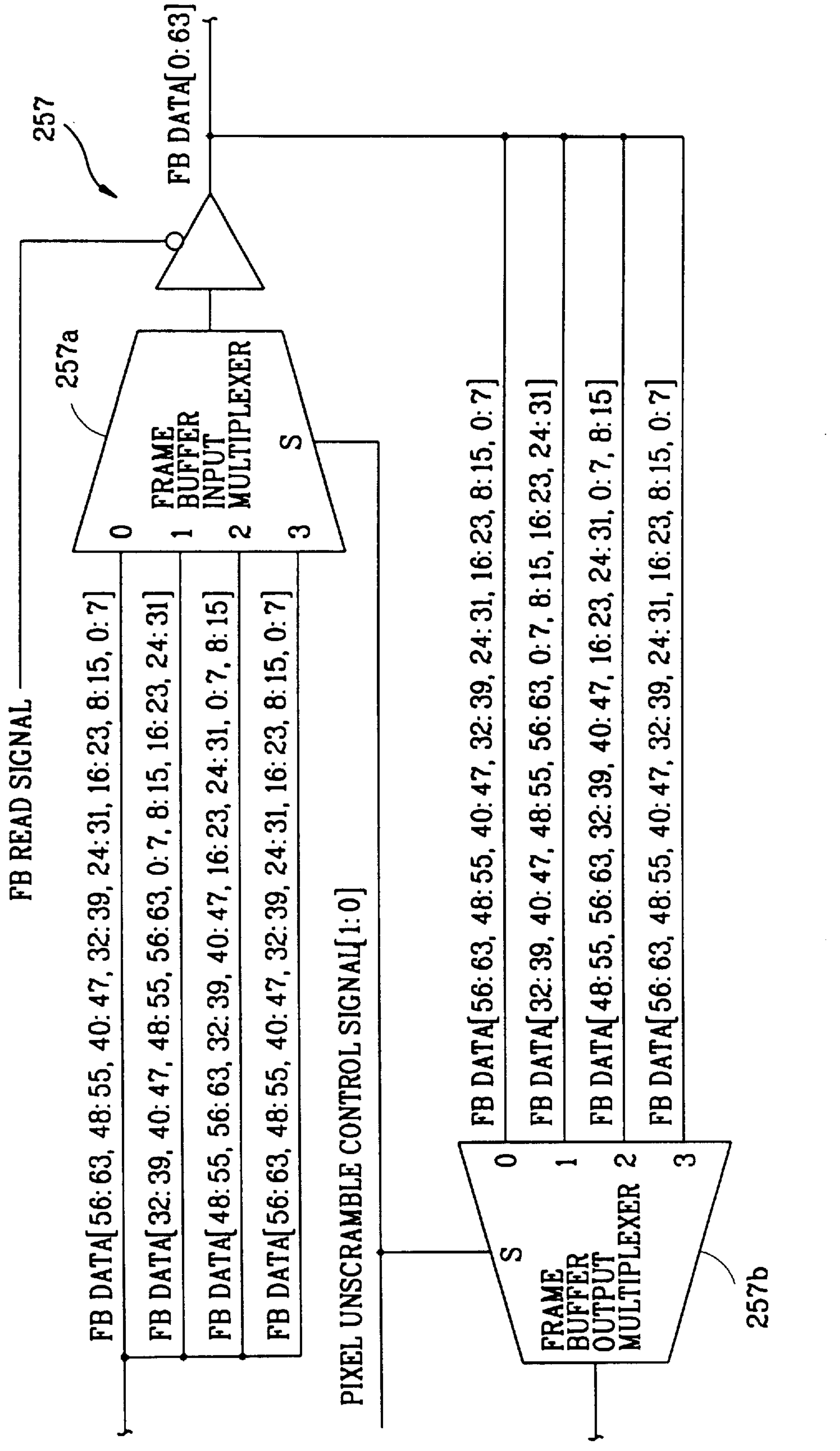
FIG. 4 CONVENTIONAL ART
FIG. 4 is a view illustrating the detailed construction of a byte rearrangement logic and a rearranging operation of a pixel data of the frame buffer input/output multiplexer.
Figure 5:
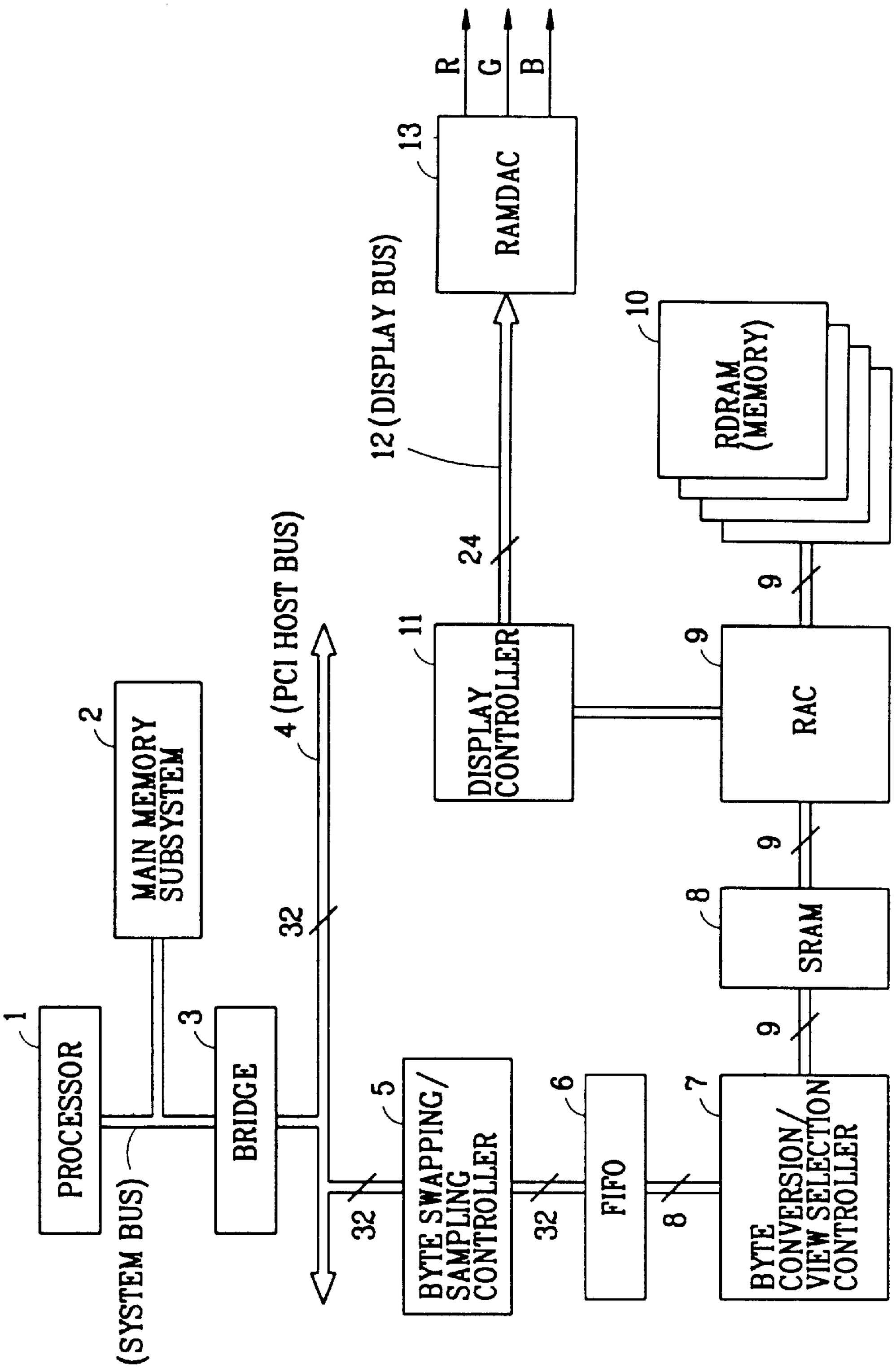
FIG. 5 is a block diagram illustrating an interface control apparatus for a frame buffer according to the present invention.

FIG. 5 illustrates the interface control apparatus for a frame buffer according to the present invention.

As shown therein, a processor 1 controls a main memory subsystem 2 and a bridge 3 through a system bus, and the bridge 3 interfaces the processor 1 and a PCI host bus 4.

A byte swapping/sampling controller 5 is connected between the PCI host bus and the FIFO(First In first Out) and performs a data conversion between a big Endian data and a little Endian data or a data conversion between a system data and a user data.

A byte conversion/view selection controller 7 is connected between the FIFO and a SRAM(Static Random Access Memory) and converts a 8 bit-1 byte pixel data stored in the FIFO 6 into a 9 bit-1 byte pixel data in accordance with the view selected or converts a 9 bit-1 byte pixel data stored in the SRAM 8 into a 8 bit-1 byte pixel data. a RAC(Rambus Access Controller) 9 stores the pixel data outputted from the SRAM 8 into a DRAM(Rambus DRAM) 10 or outputs the pixel data stored in the RDRAM 10 to a display controller 11.

The display controller 11 outputs the pixel data outputted to the RAC 10 through the display bus 12, and the RAMDAC 13 converts the pixel data R,G,B outputted from the display controller 11 into an analog signal and outputs to a display apparatus(not shown).

Figure 6:
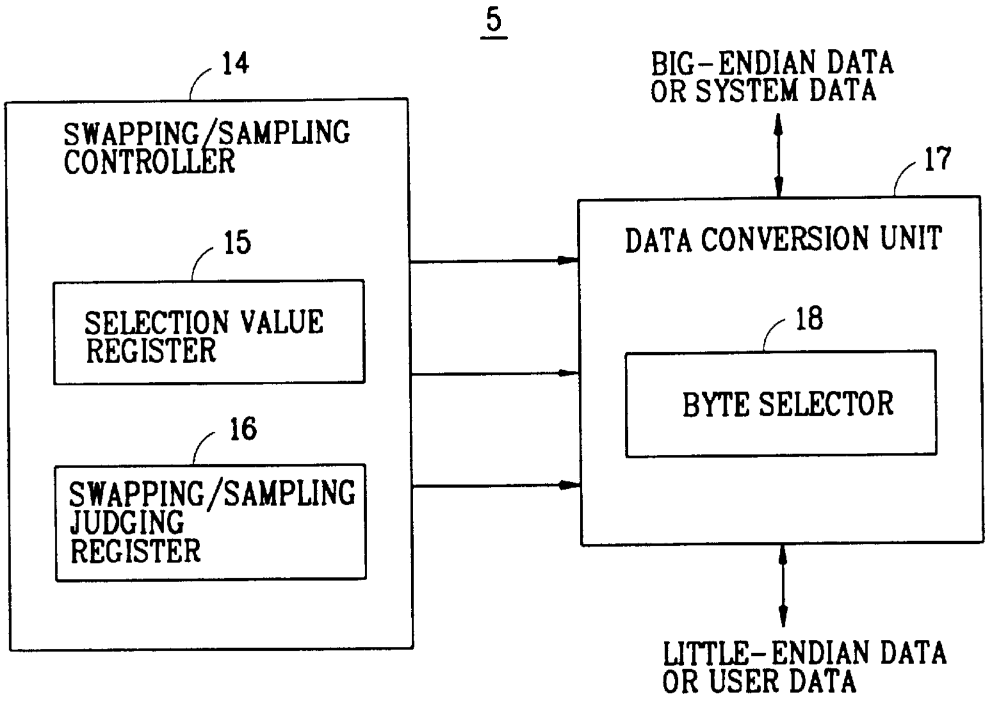
FIG. 6 is a detailed block diagram illustrating the byte swapping/sampling controller of FIG. 5.

FIG. 6 illustrates the byte swapping/sampling controller 5.

The byte swapping/sampling controller 5 includes a swapping/sampling controller 14 and a bus Endian converter 17. The swapping/sampling controller 14 includes a selection value register 15 for storing a selection value used for a data conversion between the big Endian data and the little Endian data, and a swapping/sampling judging register 16 for judging whether the pixel data is swapped or sampled. In addition, the bus Endian converter 17 performs a conversion operation between the bus Endian data and the little Endian data or the system data and the user data through the byte selector 18 in accordance with a control of the swapping/sampling controller 14.

Figure 7:
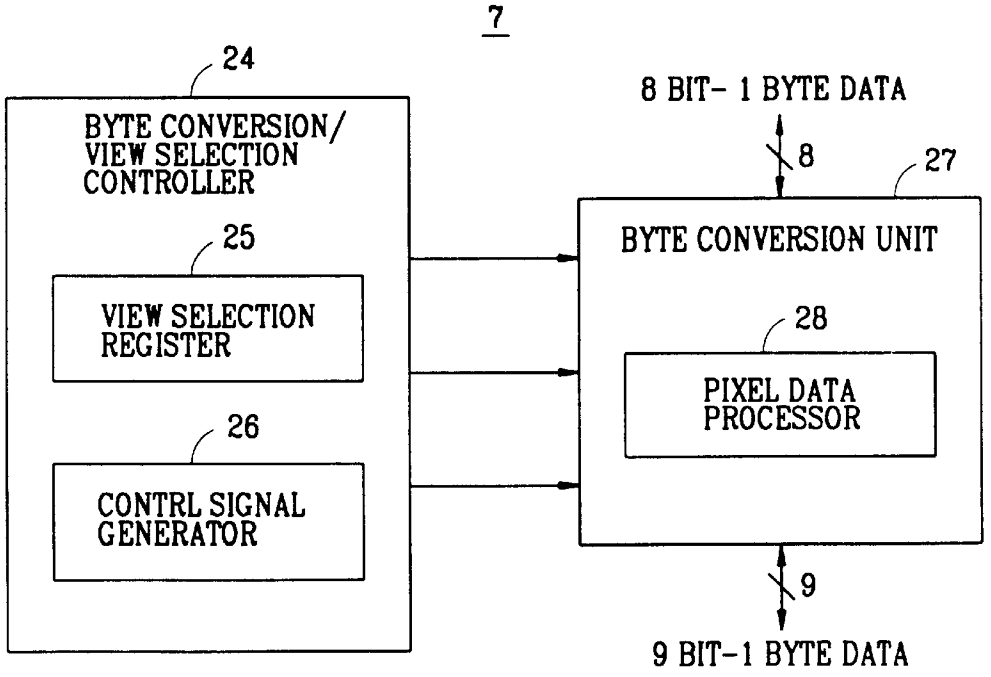
FIG. 7 is a detailed block diagram illustrating the byte conversion/view selection controller of FIG. 5.

FIG. 7 illustrates the byte conversion/view selection controller 7.

The byte conversion/view selection controller 7 includes a byte conversion/view selection controller 24, and a byte converter 27. The byte conversion/view selection controller 24 includes a view selection register 25 for storing the view selection value, and a control signal generator 26 for outputting a byte conversion control signal. In addition, the byte converter 27 performs a byte conversion between the pixel data of the 8 bit-1 byte and the pixel data of the 9 bit 1 byte through the pixel data processor 28 in accordance with a control of the byte conversion/view selection controller 24.

The operation of the interface control apparatus for a frame buffer according to the present invention will be explained.

First, the present invention is basically directed to a data conversion between the PCI host bus of the 8 bit-1 byte and the RAM bus DRAM of the 9 bit-1 byte in the system memory using different byte definitions and bus Endians.

The processor 1 controls the main memory subsystem 2 and the bridge through the system bus, and the bridge 3 interfaces the processor 1 and the PCI host bus 4.

The swapping/sampling controller 14 of the byte swapping/sampling controller 5 judges whether the byte swapping is performed based on the swapping/sampling is judging register 16 or the byte sampling is performed based on the same. At this time, in the judging operation, when the system data or the user data is inputted, the byte sampling is performed. When the big Endian data or the little Endian data is inputted, the byte swapping is performed. In addition, as a result of the judgement, the selection value storing register 15 outputs a predetermined selection value stored.

Therefore, the byte selector 18 of the bus Endian converter 17 performs the byte swapping between the big Endian data and the little Endian data and the byte sampling operation between the system data and the user data in accordance with a selection value from the selection value storing register 15.

FIG. 8 illustrates a selection value stored in the selection value storing register 15.

FIGS. 9A and 9B illustrates an embodiment of the byte swapping and byte sampling.

1. Byte swapping operation

When the little Endian data is inputted from the FIFO 6, the swapping/sampling judging register 16 outputs a control signal for the byte swapping, and the selection value string register 15 outputs a predetermined selection value for the byte swapping.

At this time, assuming that the selection value storing register 15 outputs a selection value of 13571357 as shown in FIG. 9A, the output terminal of the byte selector 18 is R7R6R5R4R3R2R1R0, and the 1 byte of the little Endian data is B7B6B5B4B3B2B1B0, the byte selector 18 receives a control signal for the byte swapping and a selection value of 13571357 and converts the little Endian data of B7B6B5B4B3B2B1B0 into the big Endian data of B0B1B2B3B4B5B6B7.

Namely, the byte selector 18 outputs B7 through R0, B6 through R1, and B5 through R2 based on the interrelationship as shown in FIG. 8. In addition, the byte selector 18 outputs B4 through R3, B2 through R5, B1 through R6, and B0 through R7 in the same manner.

Therefore, since B0B1B2B3B4B5B6B7 is outputted through the output terminal of R7R6R5R4R3R2R1R0 of the byte selector 18, the little Endian data is converted into the big Endian data. In addition, the conversion from the big Endian data to the little Endian data is performed in the sequence reverse to the above-described sequence.

2. Byte sampling operation

Next, when the user data is inputted, the swapping/sampling judging register 16 outputs a control signal for the byte sampling. At this time, assuming that the selection value outputted from the selection storing register 15 as shown in FIG. 9B is 1111111, the byte selector 18 outputs B1 through R0, B2 through R1, and B3 through R2 based on the interrelationship as shown in FIG. 8. In addition, the byte selector 18 outputs B4 through R3, B5 through R4, B6 through R5, B7 through R6, and B0 through R7 in the same manner.

Therefore, B0B7B6B5B4B3B2B1 is outputted through the output terminal of R7R6R5R4R3R2R1R0 of the byte selector 18, and the user data is sampled to the system data. In addition, the conversion from the system data to the user data is performed in the sequence reverse to the above-described sequence.

FIG. 10 is a table illustrating the view selection value stored in the view selection register 25. FIGS. 11A and 11B are an embodiment of the 8-bit view data conversion and the 18-bit view data conversion.

1. 8-bit view data conversion

The view selection register 25 outputs a view selection value of 0×0 for the 8-bit view data conversion, and the byte conversion signal generator 26 outputs a control signal.

Therefore, the pixel data processor 28 of the byte converter 27 converts the 8 bit-1 byte into the 9 bit-1 byte or the 9 bit-1 byte into the 8 bit-1 byte.

For example, when converting the 8 bit-1 byte into the 9 bit-1 byte, the pixel data processor 28, as shown in FIG. 11A, shifts the bit [7:0] of the 8 bit-1 byte to the bit [7:0] of the 9 bit-1 byte, and writes "0" into the bit 8 of the 9 bit-1 byte or writes a sign bit.

On the contrary, when converting the 9 bit-1 byte into the 8 bit-1 byte, the pixel data processor 28 removes the bit 8 from the all bytes of the 9 bit-1 byte and writes the bit [7:0] of the 9 bit-1 byte into the bit [7:0] of the 8 bit-1 byte.

2. 18-bit view data conversion

The view selection register 25 outputs a view selection value of 0×1 for the 18-bit view data conversion, and the byte conversion control signal generator 26 generates a control signal.

When converting the 8 bit-1 byte into the 9 bit-1 byte, the pixel data processor 28, as shown in FIG. 11B, discards the upper 14 bit of the bit [31:18] of the 8 bit-1 byte and writes the bit [17:0] into the bit [17:0] of the 9 bit-1 byte.

On the contrary, when converting the 9 bit-1 byte into the 8 bit-1 byte, the pixel data processor 28 writes the bit [17:0] of the 9 bit-1 byte into the bit [17:0] of the 8 bit-1 byte, and writes "0" into the bit [31:18] of the 8 bit-1 byte.

Figure 12A:
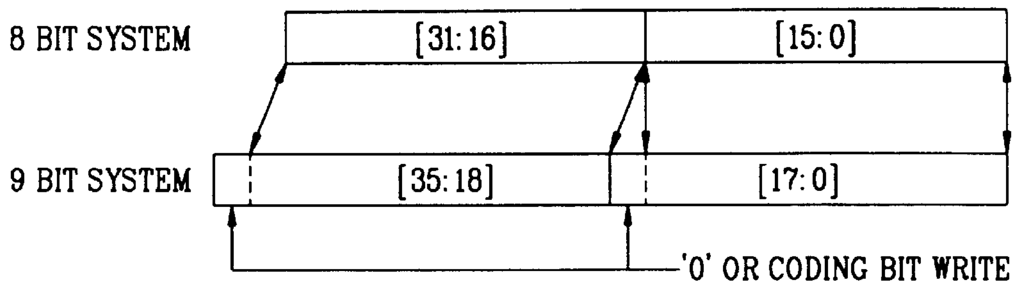
FIGS. 12A and 12B are views illustrating an embodiment of a 16-bit view and 32-bit view data conversion.
Figure 12B:
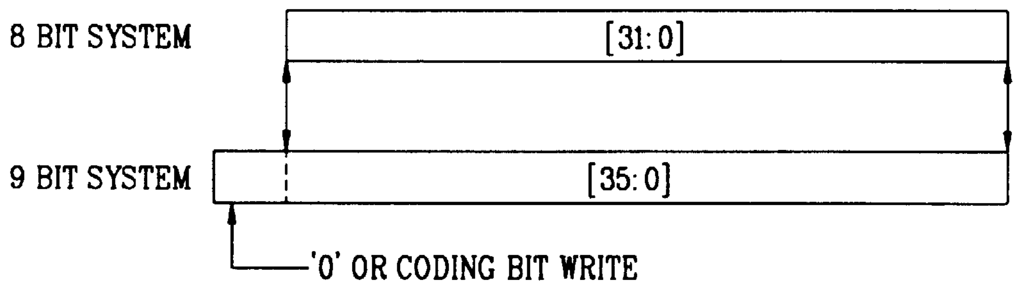

FIGS. 12A and 12B illustrate the 16-bit view and 32-bit view data conversions. At this time, the view selection register 25 outputs view selection views of 0×2 and 0×3 for the 16-bit view and 32-bit view data conversions.

3. 16-bit view data conversion

When converting the 8 bit-1 byte into the 9 bit-1 byte, the pixel data processor 28, as shown in FIG. 12A, shifts the bit [15:0] of the 8 bit-1 byte to the bit [15:0] of the 9 bit-1 byte and writes "0" into the bit 16 and the bit 17 of the 9 bit-1 byte, respectively, or writes a sign bit.

On the contrary, when converting the 9 bit-1 byte into the 8 bit-1 byte, the pixel data processor 28 removes the bit 17 and bit 18, which are the upper bits, from the bit [17:0] of the 9 bit-1 byte and writes the bit [15:0] of the 9 bit-1 byte into the bit [15:0] of the 8 bit-1 byte.

4. 32-bit view data conversion

When converting the 8 bit-1 byte into the 9 bit-1 byte, the pixel data processor 28, as shown in FIG. 12B, shifts the bit [31:0] of the 8 bit-1 byte to the bit [31:0] of the 9 bit-1 byte and writes "0" into the bits 32 through 35 of the 9 bit-1 byte or writes a sign bit.

On the contrary, when converting the 9 bit-1 byte into the 8 bit-1 byte, the pixel data processor 28 removes the bits 32 trough 35, which are the upper bits, from the bit [35:0] of the 9 bit-1 byte and writes the bit [31:0] of the 9 bit-1 byte into the bit [31:0] of the 8 bit-1 byte.

Figure 13A:
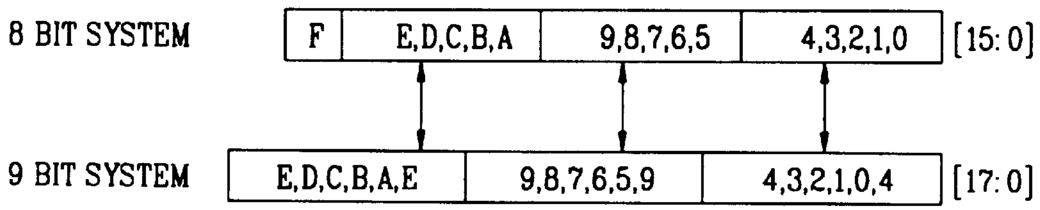
FIGS. 13A and 13B are views illustrating an embodiment of a 555RGB bit view and 565RGB bit view data conversion.
Figure 13B:
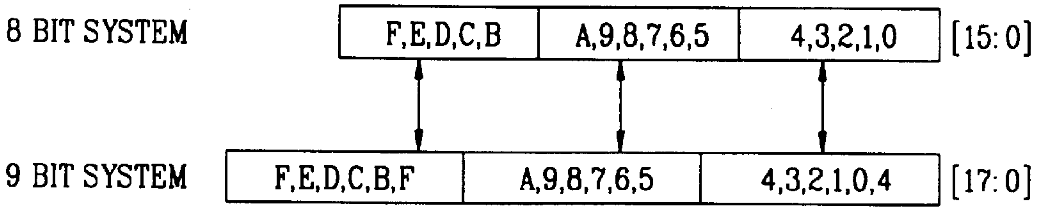

FIGS. 13A and 13B illustrate an embodiment of the 555RGB bit view and the 565RGB bit view. At this time, the view selection register 25 output view selection values of 0×4 and 0×5.

5. 555RGB bit view data conversion

When converting the 8 bit-1 byte into the 9 bit-1 byte, the pixel data processor 28, as shown in FIG. 13A, writes the bit [4:0] of the 8 bit-1 byte into the bit [5:1] of the 9 bit-1 byte and writes the bit 4 of the 8 bit-1 byte into the bit 0 of the 9 bit-1 byte.

In addition, the bit [9:5] of the 8 bit-1 byte is written into the bit [B:7] of the 9 bit-1 byte, and the bit 9 of the 8 bit-1 byte is written into the bit 6 of the 9 bit-1 byte. In addition, the bit [E:A] of the 8 bit-1 byte is written into the bit [11:D] of the 9 bit-1 byte, and the bit E of the 8 bit-1 byte is written into the bit C of the 9 bit-1 byte.

On the contrary, when converting the 9 bit-1 byte into the 8 bit-1 byte, the pixel data processor 28 removes the bit 0 from the bit [5:0] of the 9 bit-1 byte and writes the removed bit into the bit [4:0] of the 8 bit-1 byte, and the bit 6 is removed from the bit [B:6] of the 9 bit-1 byte, and the removed bit is written into the bit [9:5] of the 8 bit-1 byte. In addition, the bit C is removed from the bit [11:C] of the 9 bit-1 byte, and the removed bit is written into the bit [E:A] of the 8 bit-1 byte, and "0" is written into the bit F of the 8 bit-1 byte.

6. 565RGB bit view data conversion

When converting the 8 bit-1 byte into the 9 bit-1 byte, the pixel data processor 28, as shown in FIG. 13A, writes the bit [4:0] of the 8 bit-1 byte into the bit [5:1] of the 9 bit-1 byte and the bit 4 of the 8 bit-1 byte into the bit 0 of the 9 bit-1 byte.

In addition, the bit [A:5] of the 8 bit-1 byte is written into the bit [B:6] of the 9 bit-1 byte, and the bit [F:B] of the 8 bit-1 byte is written into the bit [11:D] of the 9 bit-1 byte, and the bit F of the 8 bit-1 byte is written into the bit C of the 9 bit-1 byte.

On the contrary, when converting the 9 bit-1 byte into the 8 bit-1 byte, the pixel data processor 28 removes the bit 0 from the bit [5:0] of the 9 bit-1 byte and writes the removed data into the bit [4:0] of the 8 bit-1 byte, and the bit [B:6] of the 9 bit-1 byte is written into the bit [A:5] of the 8 bit-1 byte, and the bit C is removed from the bit [11:C] of the 9 bit-1 byte, and the removed bit is written into the bit [F:B] of the 8 bit-1 byte.

Figure 14A:
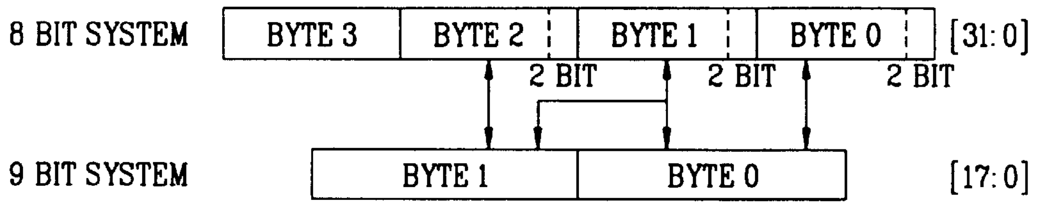
FIGS. 14A and 14B are views illustrating an embodiment of a 24-bit view and 1ER bit view data conversion.
Figure 14B:
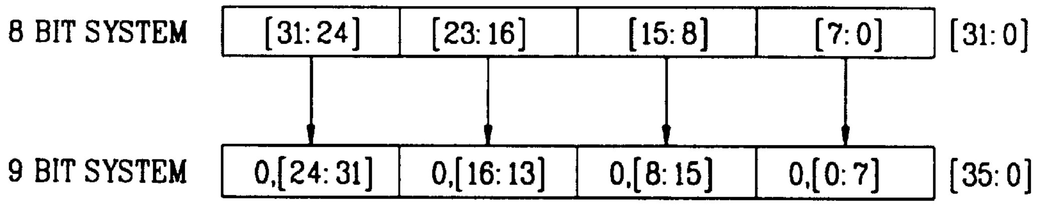

FIGS. 14A and 14B illustrate an embodiment of the 24 bit view and 1ER(Expand and Reverse) bit view data conversion. At this time, the view selection register 25 outputs view selection values of 0×6 and 0×7.

7 24-bit view data conversion

When converting the 8 bit-1 byte into the 9 bit-1 byte, the pixel data processor 28, as shown in FIG. 14A, removes the byte 0 and byte 2 of the 8 bit-1 byte by the lower two bits, forms 18 bits and writes the formed bit into the bit [17:0] of the 9 bit-1 byte.

On the contrary, when converting the 9 bit-1 byte into the 8 bit-1 byte, the pixel data processor 28 adds the bit 5 and bit 4 to the bit [5:0] of the 9 bit-1 byte, writes the added bits into the bit [7:0] of the 8 bit-1 byte, adds the bit 11 and bit 10 to the bit [11:6] of the 9 bit-1 byte, and writes the added bits into the bit [15:8] of the 8 bit-1 byte. In addition, the bit 17 and bit 16 are added to the bit [17:12] of the 9 bit-1 byte, writes the added bits into the bit [23:16] of the 8 bit-1 byte, and writes "0" into the bit [31:24] of the 8 bit-1 byte.

8. 1ER view data conversion

In the 1ER view data conversion, as shown in FIG. 14B, when converting the 8 bit-1 byte into the 9 bit-1 byte, the bit [7:0] of the 8 bit-1 byte is reversed, and the reversed bits are written into the bit [7:0] of the 9 bit-1 byte, and "0" is written into the bit 8 of the 9 bit-1 byte. In addition, the operation that the 9 bit-1 byte is converted into the 8 bit-1 byte is not performed.

Figure 15:
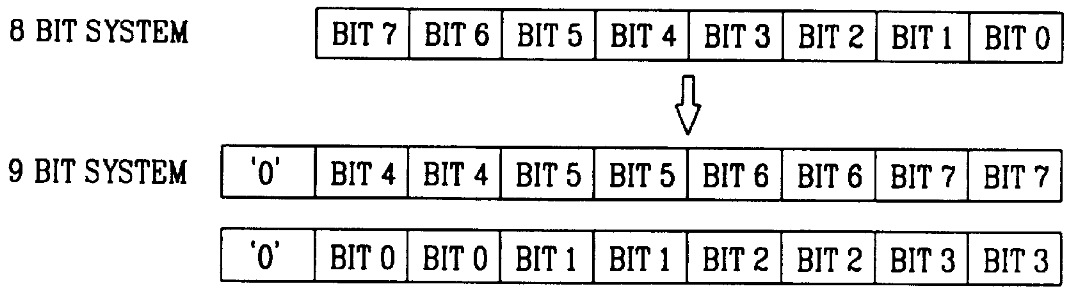
FIGS. 15 and 16 are views illustrating an embodiment of a 2ER view and 3ER view data conversion.
Figure 16:
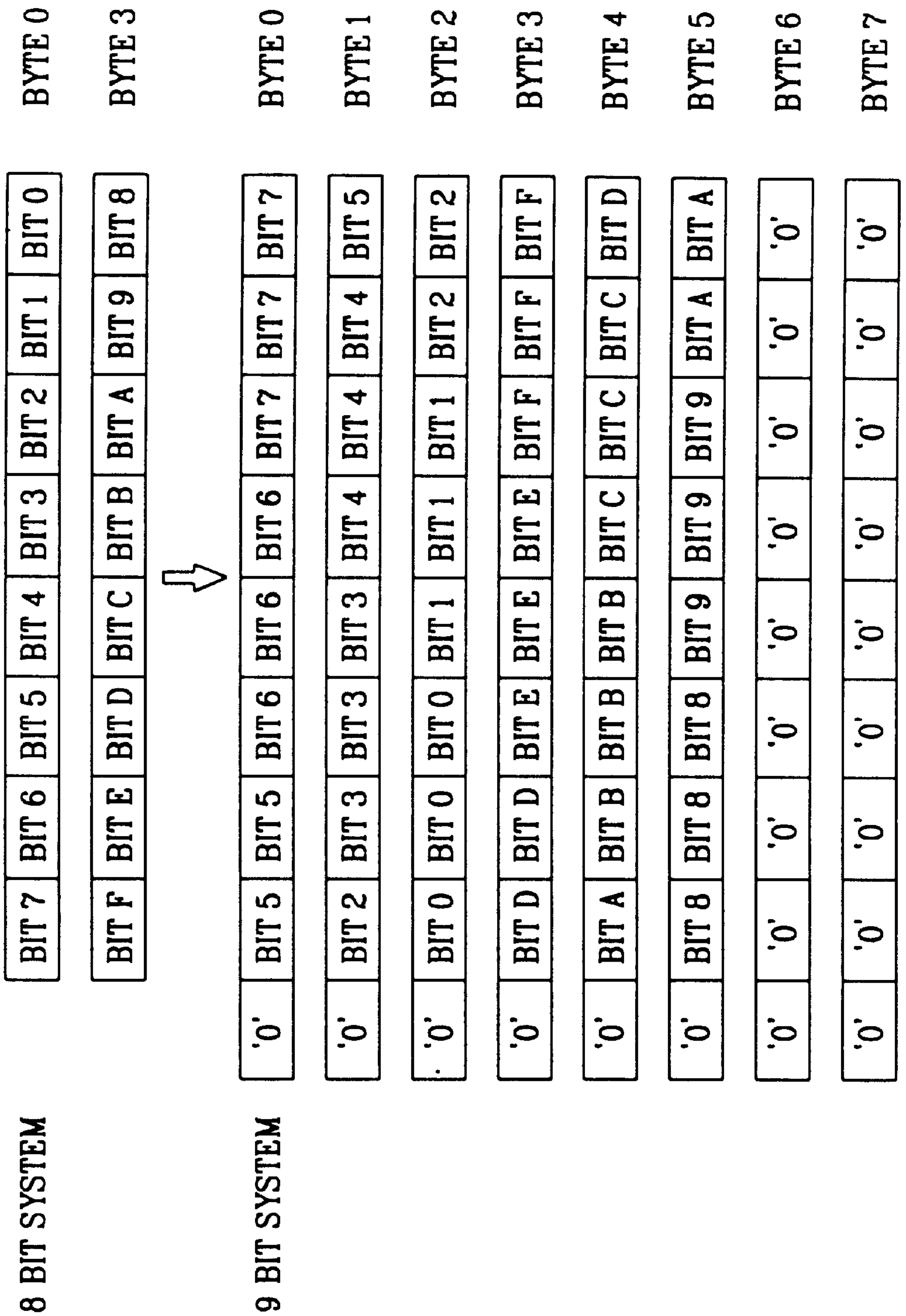

FIGS. 15 and 16 illustrate an embodiment of the 2ER view and 3ER data conversion. At this time, the view selection register 25 outputs the view selection values of 0×8 and 0×9.

9. 2ER view data conversion

When converting the 8 bit-1 byte into the 9 bit-1 byte, the pixel data processor 28, as shown in FIG. 15, reverses the bit [7:0] of the 8 bit-1 byte, and the bits are copied, and the copied bits are written into the 2-byte of the 9 bit-1 byte, and "0" is written into the MSB(Most significant Bit) of each byte. In addition, the operation that the 9 bit-1 byte is converted into the 8 bit-1 byte is not performed.

10. 3ER view data conversion

When converting the 8 bit-1 byte into the 9 bit-1 byte, the pixel data processor 28, as shown in FIG. 15, reverses the bit [7:0] of the 8 bit-1 byte and copies the bits twice, and reverses the bit [31:24] of the 8 bit-1 byte and copies each bit twice. Thereafter, the bit [31:24] of the 8 bit-1 byte is reversed, and each bit copied twice, and the copied bits are written into the 6-byte of the 9 bit-1 byte. "0" is written into the MSB of each byte. In addition, "0" is written into the byte 6 and byte 7 of the 9 bit- 1 byte.

On the contrary, the operation that the 9 bit-1 byte is converted into the 8 bit-1 byte 0 is not performed.

Therefore, the byte conversion/view selection controller 7 converts the pixel data of the 8 bit-1 byte stored in the FIFO 6 into the pixel data of the 9 bit-1 byte in accordance with the view selected or converts the pixel data of the 9 bit-1 byte stored in the SRAM 8 into the pixel data of the 8 bit-1 byte.

In addition, the RAC 9 stores the pixel data of the SRAM 8 into the RDRAM 10 or outputs the pixel data stored in the RDRAM 10 to the display controller 11. The RAMDAC 13 receives the pixel data outputted from the display controller 11 through the display bus 12 and converts the digital pixel data into the analog graphic signals R,G,B and outputs to the display apparatus(not shown).

As described above, in the pixel data transmission between the PCI host bus of the 8 bit-1 byte and the RAM bus DRAM of the 9 bit-1 byte using the system memory having different byte definitions and different bus Endians, it is possible to concurrently perform the pixel data conversion between the big Endian and the little Endian, the data conversion between the system data and the user data are performed, and the pixel data conversion between the system using the 8 bit-1 byte and the system using the 9 bit-1 byte.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In an interface control apparatus for a frame buffer in which a pixel data transmission is controlled between a PCI host bus of a 8 bit-1 byte and a RAM bus DRAM of a 9 bit-1 byte using a system memory having different byte definitions and different bus Endians, the PCI host bus is connected with a processor through a bridge, and the processor controls a main memory sub-system and the bridge through a system bus, comprising:

a byte swapping/sampling controller connected between the PCI host bus and a FIFO(First In First Out) for performing a data conversion between a big Endian data and a little Endian data or a data conversion between a system data and a user data;

a byte conversion/view selection controller connected between the FIFO and the SRAM for converting a pixel data stored in the FIFO from a 8 bit-1 byte data to is a 9 bit-1 byte data in accordance with a view selected or converting a pixel data stored in the SRAM from a 9 bit-1 byte data into a 8 bit-1 byte in accordance with a view selected;

a RAC for controlling a transmission of a pixel data between the SRAM and the RAM bus DRAM; and a display controller for receiving a pixel data outputted from the RAM bus DRAM through the RAC and outputting to the RAMDAC through the display bus.

2. The apparatus of claim 1, wherein said byte swapping/sampling controller includes:

a swapping/sampling controller having:

a selection value register for storing a selection value used for a conversion of the pixel data therein; and a swapping/sampling judging register for judging whether the pixel data is swapped or sampled and outputting a control signal as a result of the judgement; and a bus Endian converter for performing a data conversion between a big Endian data and a little Endian data or a data conversion between the system data and the user data through a byte selector in accordance with a control signal and selection value outputted from the swapping/sampling controller.

3. The apparatus of claim 1, wherein said byte conversion/view selection controller includes:

a byte conversion/view selection controller having a view selection register for storing a view selection value therein, and a byte conversion control signal generator for outputting a byte conversion control signal; and a byte converter for performing a byte conversion between the pixel data of the 8 bit-1 byte and the pixel data of the 9 bit-1 byte in accordance with a byte conversion control signal and a view selection value outputted from the byte conversion/view selection controller.

4. The apparatus of claim 3, further comprising:

a pixel data processor for performing a 8-bit view data conversion in accordance with a view selection value and a byte conversion control signal when the view selection value is 0×0 and performing a 18-bit view data conversion when the view selection value is 0×1.

5. The apparatus of claim 4, wherein in said 8-bit view data conversion, a bit [7:0] of the 8 bit-1 byte is shifted to a bit [7:0] of the 9 bit-1 byte when converting the 8 bit-1 byte into the 9 bit-1 byte, and "0" or a sign bit is written into a bit 8 of the 9 bit-1 byte, and on the contrary, the bit 8 is removed from all bytes of the 9 bit-1 byte when converting the 9 bit-1 byte into the 8 bit-1 byte, and the bit [7:0] of the 9 bit-1 byte is written into the bit [7:0] of the 8 bit-1 byte.

6. The apparatus of claim 4, wherein in said 18-bit view data conversion, the upper 14-bit of the bit [31:18] of the 8 bit-1 byte is discarded when converting the 8-bit-1 byte into the 9 bit-1 byte, and the bit [17:0] is written into the bit [17:0] f the 9 bit-1 byte, and on the contrary, when converting the 9 bit-1 byte into the 8 bit-1 byte, the bit [17:0] of the 9 bit-1 byte is written into the bit [17:0] of the 8 bit-1 byte, and "0" is written into the bit [31:18] of the 8 bit-1 byte.

7. The apparatus of claim 3, further comprising:

a pixel data processor for performing a 16-bit view data conversion when the view selection value is 0×2 in accordance with a view selection value and a byte conversion control signal and performing a 32-bit view data conversion when the view selection value is 0×3 in accordance with the same.

8. The apparatus of claim 7, wherein in said 16-bit view data conversion, the bit [15:0 ] of the 8 bit-1 byte is shifted to the bit [15:0] of the 9 bit-1 byte when converting the 8 bit-1 byte into the 9 bit-1 byte, and "0" or a sign bit is written into the bit 16 and the bit 17 of the 9 bit-1 byte, and on the contrary, when converting the 9 bit-1 byte into the 8 bit-1 byte, the pixel data processor removes the bit 17 and the bit 16 from the bit [17:0] of the 9 bit-1 byte, and the bit [15:0] of the 9 bit-1 byte is written into the bit [15:0] of the 8 bit-1 byte.

9. The apparatus of claim 7, wherein in said 32-bit view data conversion, the bit [31:0] of the 8 bit-1 byte is shifted to the bit [31:0] of the 9 bit-1 byte when converting the 8 bit-1 byte into the 9 bit-1 byte, and "0" or a sign bit is written into the bits 32–35 of the 9 bit-1 byte, and on the contrary, when converting the 9 bit-1 byte into the 8 bit-1 byte, the bits 32–35 are removed from the bit [35:0] of the 9 bit-1 byte, and the bit [31:0] of the 9 bit-1 byte is written into the bit [31:0] of the 8 bit-1 byte.

10. The apparatus of claim 3, further comprising:

a pixel data processor for performing a 555RGB bit view data conversion in accordance with a view selection value and a byte conversion control signal when a view selection value is 0×4 and performing a 565RBG bit view conversion in accordance with the same when the view selection value is 0×5.

11. The apparatus of claim 10, wherein in said 555RGB bit view data conversion, when converting the 8 bit-1 byte into the 9 bit-1 byte, the bit [4:0] of the 8 bit-1 byte is written into the bit [5:1] of the 9 bit-1 byte, and the bit 4 of the 8 bit-1 byte is written into the bit 0 of the 9 bit-1 byte, and the bit [9:5] of the 8 bit-1 byte is written into the bit [B:7] of the 9 bit-1 byte, and the bit 9 of the 8 bit-1 byte is written into the bit 6 of the 9 bit-1 byte, and the bit [E:A] of the 8 bit-1 byte is written into the bit [11:D] of the 9 bit-1 byte, and the bit E of the 8 bit-1 byte is written into the bit C of the 9 bit-1 byte.

12. The apparatus of claim 10, wherein in said 555RGB bit view data conversion, when converting the 9 bit-1 byte into the 8 bit-1 byte, the bit 0 is removed from the bit [5:0] of the 9 bit-1 byte, and the removed bit is written into the bit [4:0] of the 8 bit-1 byte, and the bit 6 is removed from the bit [B:6] of the 9 bit-1 byte, and the removed bit is written into the bit [9:5] of the 8 bit-1 byte, and the bit C is removed from the bit [11:C] of the 9 bit-1 byte, and the removed bit is written into the bit [E:A] of the 8 bit-1 byte, and "0" is written into the bit F of the 8 bit-1 byte.

13. The apparatus of claim 10, wherein in said 565RGB bit view data conversion, when converting the 8 bit-1 byte into the 9 bit-1 byte, the bit [4:0] of the 8 bit-1 byte is written into the bit [5:1] of the 9 bit-1 byte, and the bit 4 of the 8 bit-1 byte is written into the bit 0 of the 9 bit-1 byte, and the bit [A:5 J of the 8 bit-1 byte is written into the bit [B:6] of the 9 bit-1 byte, and the bit [F:B] of the 8 bit-1 byte is written into the bit [11:D] of the 9 bit-1 byte, and the bit F of the 8 bit-1 byte is written into the bit C of the 9 bit-1 byte.

14. The apparatus of claim 10, wherein in said 565RGB bit view data conversion, when converting the 9 bit-1 byte into the 8 bit-1 byte, the bit 0 is removed from the bit [5:0] of the 9 bit-1 byte, and the removed bit is written into the bit [4:0] of the 8 bit-1 byte, and the bit [B:6] of the 9 bit-1 byte is written into the bit [A:5 ] of the 8 bit-1 byte, and the bit C is removed from the bit (11:C] of the 9 bit-1 byte, and the removed bit is written into the bit [F:B] of the 8 bit-1 byte.

15. The apparatus of claim 3, further comprising:

a pixel data processor for performing a 24-bit view data conversion in accordance with a view selection value and a byte conversion control signal and performing a 1ER view data conversion accordance with the same when the view selection value is 0×7.

16. The apparatus of claim 15, wherein in said 24-bit view data conversion, when converting the 8 bit-1 byte into the 9 bit-1 byte, the lower two bits of the byte 0 byte 2 of the 8 bit-1 byte are removed for thereby forming 18 bits, and then the thusly formed bits are written into the bit [17:0] of the 9 bit-1 byte.

17. The apparatus of claim 15, wherein in said 24-bit view data conversion, when converting the 9 bit-1 byte into the 8 bit-1 byte, the bit 5 and bit 4 are added to the bit [5:0] of the 9 bit-1 byte, and the added bits are written into the bit [7:0] of the 8 bit-1 byte, and the bit 11 and bit 10 are added to the bit [11:6] of the 9 bit-1 byte, and the added bits are written into the bit [15:8] of the 8 bit-1 byte, and the bit 17 and bit 16 are added to the bit [17:12] of the 9 bit-1 byte, and the added bits are written into the bit [23:16] of the 8 bit-1 byte, and "0" is written into the bit [31:24] of the 8 bit-1 byte.

18. The apparatus of claim 15, wherein in said 1ER view data conversion, when converting the 8 bit-1 byte into the 9 bit-1 byte, the bit [7:0] of the 8 bit-1 byte is reversed, and the reversed bit is written into the bit [7:0] of the 9 bit-1 byte, and "0" is written into the bit 8 of the 9 bit-1 byte, and on the contrary, the operation that the 9 bit-1 byte is converted into the 8 bit-1 byte is not performed.

19. The apparatus of claim 3, further comprising:

a pixel data processor for performing a 2ER view data conversion in accordance with a view selection value and a byte conversion control signal when the view selection value is 0×8 and performing a 3ER view data conversion in accordance with the same when the view selection value is 0×9.

20. The apparatus of claim 19, wherein in said 2ER view data conversion, when converting the 8 bit-1 byte into the 9 bit-1 byte, the bit [7:0] of the 8 bit-1 byte is reversed, and each bit is copied, and the copied bits are written into the 2 bytes of the 9 bit-1 byte, and "0" is written into the MSB(Most Significant Bit) of each byte, and on the contrary, the operation that the 9 bit-1 byte is converted into the 8 bit-1 byte is not performed.

21. The apparatus of claim 19, wherein in said 3ER view data conversion, when converting the 8 bit-1 byte into the 9 bit-1 byte, the bit [7:0] of the 8 bit-1 byte and the bit [31:24] of the 8 bit-1 byte are reversed, and each bit is copied twice, and the thusly copied bits are written into the 6 bytes of the 9 bit-1 byte, and "0" is written into the MSB of each byte, and "0" is written into the byte 6 and byte 7 of the 9 bit-1 byte, and on the contrary, the operation that the 9 bit-1 byte is converted into the 8 bit-1 byte is not performed.

22. In a media-processor including a PCI host bus of a 8 bit-1 byte and a RAM bus DRAM of a 9 bit-1 byte using a system memory having different byte definitions and different bus Endians, an interface control apparatus for a frame buffer, comprising:

a byte swapping/sampling controller connected between the PCI host bus and the FIFO for performing a data conversion between a big Endian data and a little Endian data and a data conversion between a system data and a user data;

a byte conversion/view selection controller connected between the FIFO and the SRAM for converting the pixel data stored in the FIFO from a 8 bit-1 byte data to the 9 bit-1 byte in accordance with a view selected or converting the pixel data stored in the SRAM from a 9 bit-1 byte to a 8 bit-1 byte in accordance with a view selected; and a RAC for storing the pixel data outputted from the SRAM into the RAM bus DRAM and outputting the pixel data stored in the RAM bus DRAM to the outside for displaying the same.

23. The apparatus of claim 22, wherein said PCI host bus is connected with:

a processor;

a bridge interfacing the processor and the PCI host bus; and a main memory sub-system controlling various memories.

24. The apparatus of claim 22, wherein said RAC is connected with:

a display controller outputting a pixel data outputted from the RAC to the display bus; and a RAMDAC converting the pixel inputted from the display controller and outputting to the display apparatus.

25. The apparatus of claim 22, wherein said byte swapping/sampling controller includes:

a swapping/sampling controller having:

a selection value register for storing a selection value used for a conversion of the pixel data therein; and a swapping/sampling judging register for judging whether the pixel data is swapped or sampled and outputting a control signal as a result of the judgement; and a bus Endian converter for performing a data conversion between a big Endian data and a little Endian data or a data conversion between the system data and the user data through a byte selector in accordance with a control signal and selection value outputted from the swapping/sampling controller.

26. The apparatus of claim 22, wherein said byte conversion/view selection controller includes:

a byte conversion/view selection controller having a view selection register for storing a view selection value therein, and a byte conversion control signal generator for outputting a byte conversion control signal; and a byte converter for performing a byte conversion between the pixel data of the 8 bit-1 byte and the pixel data of the 9 bit-1 byte in accordance with a byte conversion control signal and a view selection value outputted from the byte conversion/view selection controller.

27. In a media-processor controlling a pixel data transmission between a PCI host bus of a 8 bit-1 byte and a RAM bus DRAM of a 9 bit-1 byte using a system memory having different byte definitions and different bus Endians, an interface control apparatus for a frame buffer, comprising:

a FIFO(First In First Out) for processing a pixel data based on a FIFO operation;

a SRAM for storing the pixel data therein;

a byte swapping/sampling controller connected between the PCI host bus and the FIFO for performing a data conversion between a big Endian data and a little Endian data and a data conversion between a system data and a user data;

a byte conversion/view selection controller connected between the FIFO and the SRAM for converting the pixel data stored in the FIFO from a 8 bit-1 byte data to the 9 bit-1 byte in accordance with a view selected or converting the pixel data stored in the SRAM from a 9 bit-1 byte to a 8 bit-1 byte in accordance with a view selected;

a RAC for storing the pixel data outputted from the SRAM into the RAM bus DRAM and outputting the pixel data stored in the RAM bus DRAM to the outside for displaying the same; and a display controller for outputting a pixel data outputted from the RAC to the RAMDAC through the display bus.

28. The apparatus of claim 27, wherein said byte swapping/sampling controller includes:

a swapping/sampling controller having:

a selection value register for storing a selection value used for a conversion of the pixel data therein; and a swapping/sampling judging register for judging whether the pixel data is swapped or sampled and outputting a control signal as a result of the judgement; and a bus Endian converter for performing a data conversion between a big Endian data and a little Endian data or a data conversion between the system data and the user data through a byte selector in accordance with a control signal and selection value outputted from the swapping/sampling controller.

29. The apparatus of claim 28, wherein said swapping/sampling judging register outputs a control signal for a swapping operation when a big Endian or little Endian data is inputted and outputs a control signal for a sampling operation when a system data or user data is inputted.

30. The apparatus of claim 27, wherein said byte conversion/view selection controller includes:

a byte conversion/view selection controller having a view selection register for storing a view selection value therein, and a byte conversion control signal generator for outputting a byte conversion control signal; and a byte converter for performing a byte conversion between the pixel data of the 8 bit-1 byte and the pixel data of the 9 bit-1 byte in accordance with a byte conversion control signal and a view selection value outputted from the byte conversion/view selection controller.

* * * * *